United States Patent
Zhang

(10) Patent No.: US 7,027,950 B2
(45) Date of Patent: Apr. 11, 2006

(54) REGRESSION CLUSTERING AND CLASSIFICATION

(75) Inventor: Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 10/716,855

(22) Filed: Nov. 19, 2003

(65) Prior Publication Data

US 2005/0108254 A1    May 19, 2005

(51) Int. Cl.
G06F 15/00 (2006.01)
G06F 17/18 (2006.01)

(52) U.S. Cl. ................................................ 702/181

(58) Field of Classification Search ................ 702/179, 702/181
See application file for complete search history.

(56) References Cited

U.S. PATENT DOCUMENTS

| 5,933,818 A * | 8/1999 | Kasravi et al. ............. 706/12 |
| 2003/0033436 A1 | 2/2003 | Weiss |
| 2003/0182082 A1* | 9/2003 | Keller et al. ............. 702/179 |
| 2004/0009489 A1* | 1/2004 | Golub et al. ............. 435/6 |
| 2004/0024773 A1* | 2/2004 | Stoffel et al. ............. 707/102 |

OTHER PUBLICATIONS

Nazeri et al., Mining Aviation Data to Understand Impacts of Severe Wether on Airspace System Performance, Apr. 2002,Information Technology: Coding and Computing, 2002. pp. 518-523.*

W. S. DeSoto, et al., "A Maximum Likelihood Methodology for Clusterwise Linear Regression," Journal of Classification 5:249-282 (1988).

C. Henning, "Regression Fixed Point Clusters: Motivation, Consistency and Simulations," Feb. 20, 2000, pp. 1-49.

C. Henning, "Models and Methods for Clusterwise Linear Regression," Classification in the Information Age, Springer, Berlin 1999, 179-187.

* cited by examiner

Primary Examiner—John Barlow
Assistant Examiner—Demetrius R. Pretlow

(57) ABSTRACT

A method and a system which apply a regression clustering algorithm and a classification algorithm on the dataset are provided. In particular, a method and a system are provided which generate a plurality of different functions correlating datapoints of a dataset and determine directives by which to classify new data with respect to the plurality of different functions.

29 Claims, 3 Drawing Sheets

REGRESSION CLUSTERING AND CLASSIFICATION

BACKGROUND

1. Field of the Invention

The present disclosure generally relates to data mining and, more specifically, to methods and systems for regressively clustering and classifying a dataset.

2. Background Information

With the increase in the amount of data being stored in databases as well as the number of database applications in business and the scientific domain, the need to efficiently and accurately analyze data is increasing. The term "data mining" may be used to describe such an analysis of data and may be referred to herein as the process of identifying and interpreting patterns in databases. Quick and accurate data mining may offer a variety of benefits for applications in which data is accumulated. For example, a better understanding of demand curves within a market may help a business to design multiple models of a product family for different segments of the market. Similarly, the design of marketing campaigns and purchase incentive offerings may be more effective when employed for a proper segmentation of customers, rather than being blindly presented to all customers.

In some cases, predicting values of parameters which are associated with a dataset may be useful. For example, forecasting future product sales from a customer survey may aid in determining production schedules and sale goals. In field of meteorology, forecasting weather from a collection of atmospheric data may be useful. A plurality of other applications may make use of predicting values from a dataset as well. In some cases, the process of making predictions may be dependent on the information obtained from the data mining process. In particular, the process of making predictions may, in some embodiments, involve determining directives by which to classify data into a dataset based upon information mined from the dataset. In cases in which data collection is insufficiently controlled within a dataset, the process of making predictions may be further complicated. In particular, the accuracy of making predictions may be difficult when data is partially labeled or is incomplete within a dataset.

It would, therefore, be advantageous to develop systems and methods for mining and classifying datasets. In addition, it would be beneficial to develop systems and methods for predicting values of parameters which are associated with datasets, particularly values with a relatively small uncertainty. In some cases, the systems and method may be particularly suited for a dataset having a mixture of relationships characterizing its variable parameters.

BRIEF SUMMARY

The problems outlined above may be in large part addressed by a method and a system which applies a regression clustering algorithm and a classification algorithm on the dataset. In particular, a method and a system are provided which generate a plurality of different functions correlating datapoints of a dataset and determine directives by which to classify new data with respect to the plurality of different functions.

BRIEF DESCRIPTION OF THE DRAWINGS

For a detailed description of the exemplary embodiments of the invention, reference will now be made to the accompanying drawings in which.

Figure 1:
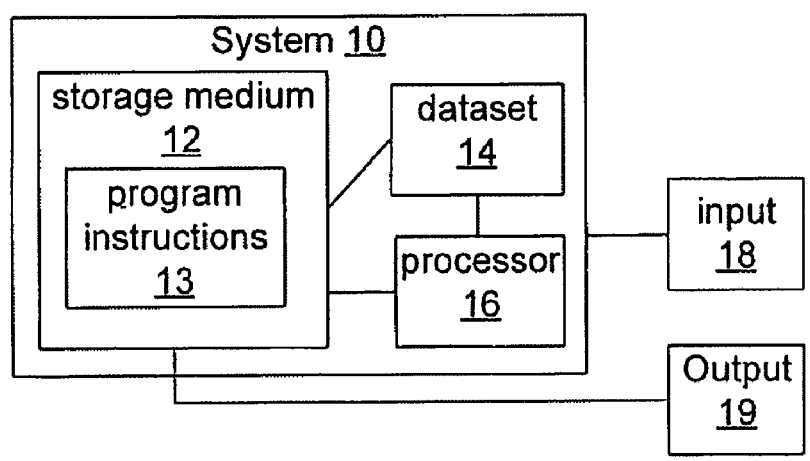
FIG. 1 depicts a schematic diagram of a system configured to regressively cluster and classify a dataset.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. In addition, the term, "data mining," as used herein, may generally refer to the process of identifying and interpreting patterns in databases.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 2:
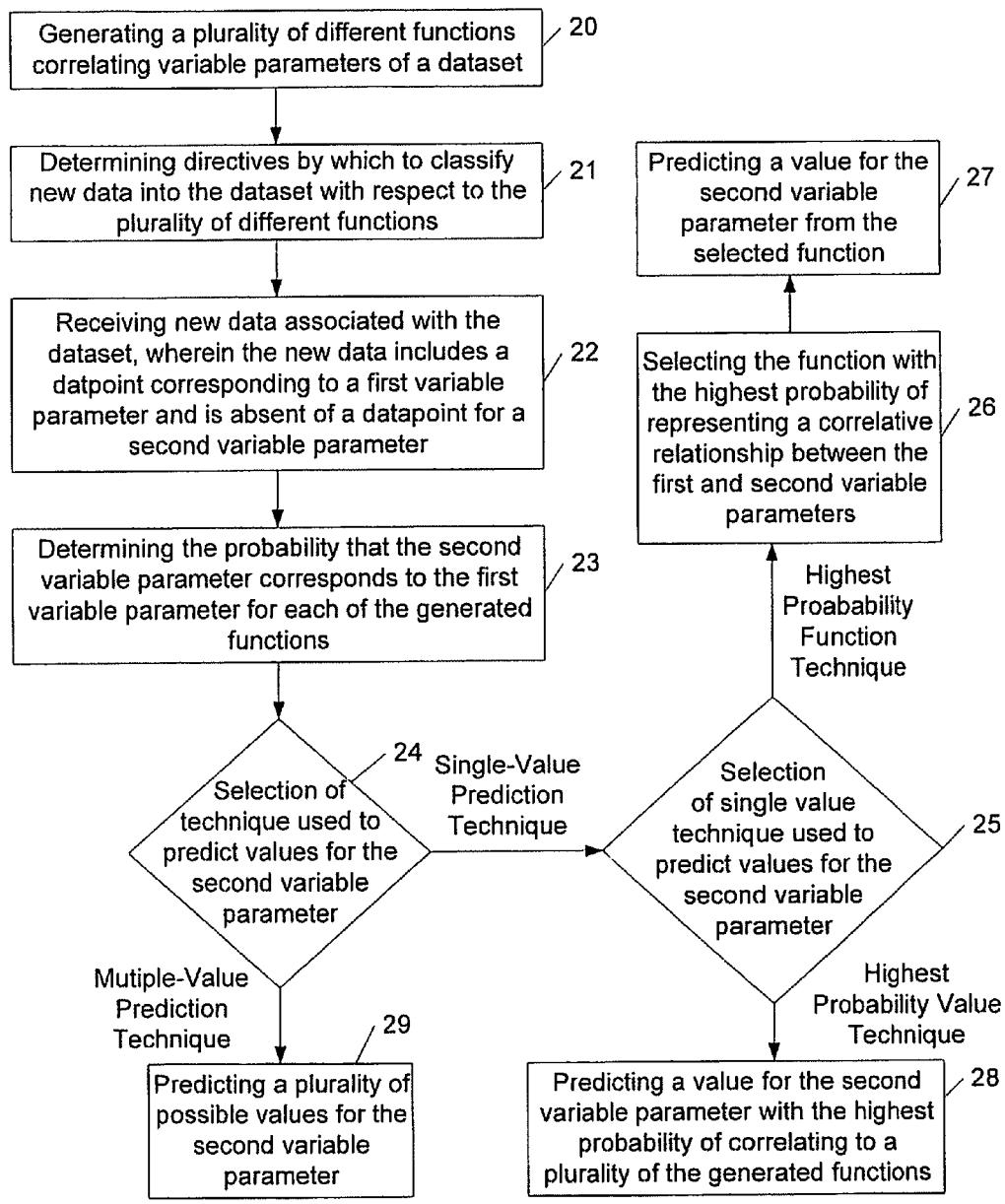
FIG. 2 depicts a flow chart of a method for mining data from a dataset and predicting values of variables parameters associated with the dataset.
Figure 3:
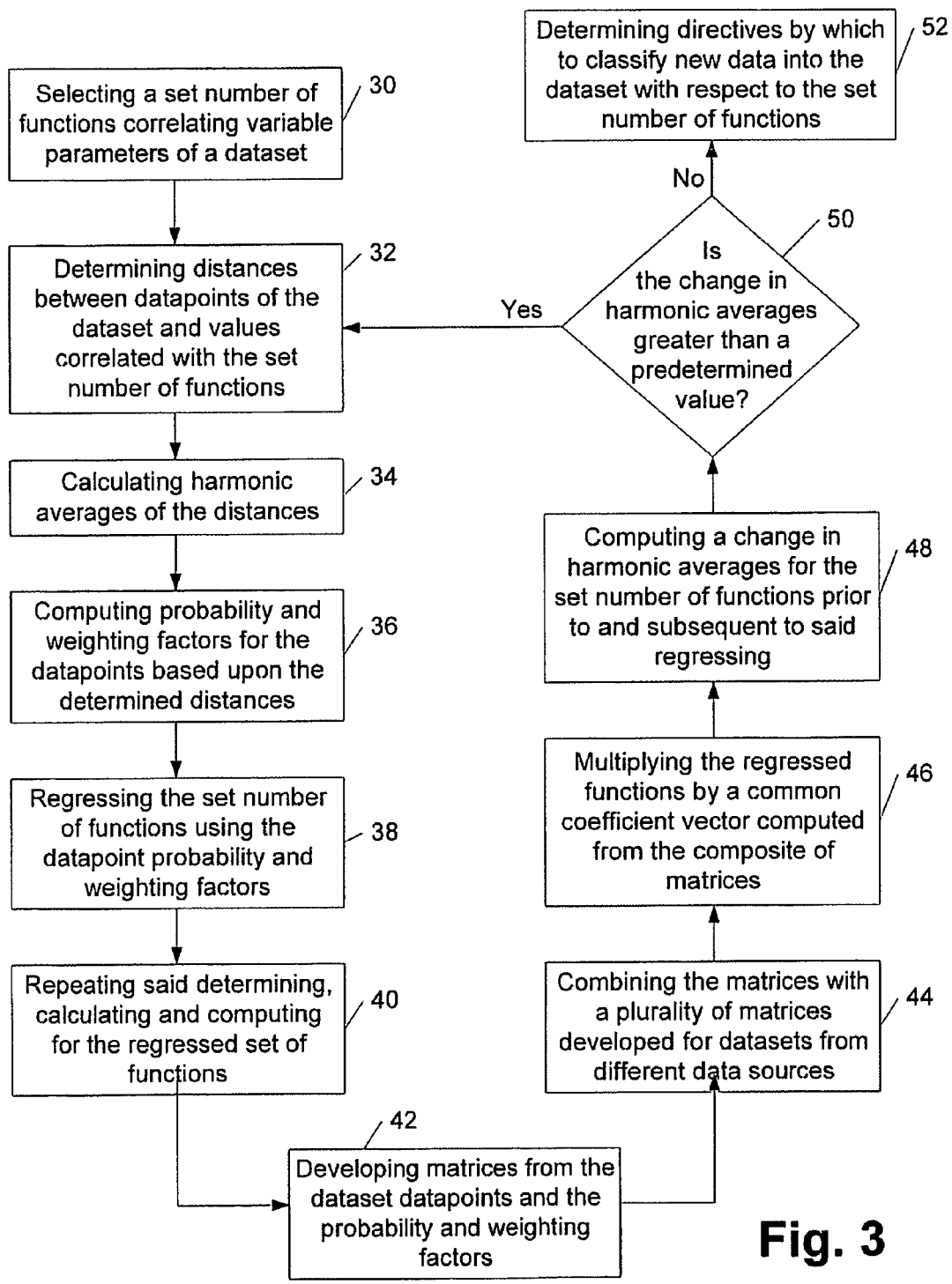
FIG. 3 depicts a flow chart of a method for regressively clustering and classifying a dataset.

Turning now to the drawings, exemplary embodiments of systems and methods for mining a dataset through the application of a regression clustering algorithm and a classification algorithm are provided. In particular, FIG. 1 illustrates system 10 configured to regressively cluster and classify dataset 14. FIGS. 2 and 3 depict flowcharts of methods for regressively clustering and classifying datasets. As will be discussed in more detail below, an Expectation Maximization (EM) objective function, a K-Means (KM) objective function or a K-Harmonic Means (KHM) objective function may be used to regressively cluster dataset 14.

Other objective functions used in the data mining industry may be used as well or alternatively to regressively cluster dataset 14. Each objective function offers a different approach for regressively clustering data. Amid the discussions of the EM, KM and KHM objective functions below, at least three distinct methods are provided for which system 10 may be configured to regressively cluster data. Other methods for regressively clustering data, however, may be used for system 10 as well or alternatively, including those that employ objective functions other than the EM, KM and KHM functions described below. Consequently, although an exemplary method for performing regression clustering using a K-Harmonic Means objective function is illustrated in the flowchart of FIG. 3 and discussed in more detail below, system 10 is not restricted to using such a method for regressively clustering dataset 10.

Regardless of the type of objective function used to regressively cluster dataset 14, the methods and system described herein may be further used to predict values associated with variable parameters of the dataset. A more detailed description of methods for predicting values associated with variable parameters of a dataset is provided below in reference to the flowchart depicted in FIG. 2. Although dataset 14 is shown in FIG. 1 as being included within system 10, dataset 14 may, in some embodiments, be separate from system 10. In particular, system 10 may additionally or alternatively be configured to access and analyze datasets external to system 10. In turn, system 10 may, in some embodiments, be configured to regressively cluster, classify and predict values associated with datasets external to system 10. As noted above and described in more detail below, the methods provided herein may include the application of one or more algorithms and, therefore, may be best implemented through a computer. Consequently, system 10 may be a computer in some cases. In addition, the methods described herein may, in some embodiments, be referred to as a "computer-implemented methods." In other cases, however, the methods described herein may be more generally referred to as "methods." The use for the two terms is not mutually exclusive and, therefore, may be used interchangeably herein.

In general, dataset 14 may be a collection of datapoints. In some embodiments, dataset 14 may represent a plurality of datasets from parallel and/or distributed data sources. In such an embodiment, system 10 may be configured to regressively cluster the plurality datasets within dataset 14 individually and, in some cases, in parallel. In additional or alternatively, system 10, in such a parallel embodiment, may be configured to regressively cluster the plurality datasets within dataset 14 as a whole. In some cases, dataset 14 may include a compilation of datapoints from a plurality of data sources and, consequently, system 10 may be configured to regressively cluster a plurality of datasets as a whole in such an embodiment as well. In yet other embodiments, dataset 14 may represent a collection of datapoints from a single data source or the single data source itself. Consequently, system 10 may be configured to regressively cluster a single set of data in some embodiments. In any case, the datapoints within dataset 14 may be correlated by a plurality of variable parameters. In some cases, the variable parameters may be correlated by a mixture of different relationships. In particular, the variable parameters within dataset 14 may be defined by a plurality of different associations with respect to each other. In addition, the dependency of the variable parameters with respect to each other may vary throughout dataset 14 in some embodiments. In particular, the correlation between variable parameters may differ with the values of the parameters.

The collection and/or the labeling of datapoints within dataset 14 may, in some embodiments, be insufficient. More specifically, some of the datapoints within dataset 14 may not be associated with a particular variable parameter of the dataset and, therefore, may not be properly labeled. In addition, the collection of datapoints within dataset 14 may not be complete or, in other words, datapoints may be missing for some of the variable parameters' values. As will be discussed in more detail below, the system and methods described herein are configured to compensate for such insufficient collections of data. In particular, embodiments in which an insufficient amount of data is collected, the methods and system described herein may be used to generate a plurality of functions which may generally represent all of the data. Consequently, the issues regarding missing and insufficiently labeled data are less of a concern. In other embodiments, the methods and system described herein may be used to determine the appropriate labels for insufficiently labeled datapoints and/or estimate values for the missing data. In this manner, the methods and system provided herein may be used to complete the dataset.

As noted above, system 10 may be configured to regressively cluster dataset 14. In some embodiments, such an adaptation may be incorporated within system 10. In particular, system 10 may include storage medium 12 with program instructions 13 executable by processor 16 to regressively cluster dataset 14. In an embodiment in which dataset 14 is external to system 10, however, the adaptation to regressively cluster dataset 14 may be additionally or alternatively incorporated within the respective data source/s of dataset 14. In particular, the data source/s of dataset 14, in such an embodiment, may include a storage medium with program instructions which are executable through a processor for regressively clustering data.

In general, input 28 may be transmitted to system 10 to execute program instructions 13 within storage medium 12. Storage medium 12 may include any device for storing program instructions, such as a read-only memory, a random access memory, a magnetic or optical disk, or a magnetic tape. Program instructions 13 may include any instructions by which to perform the regression clustering and classification processes described below. In particular, program instructions 13 may include instructions for selecting a set number of functions correlating variable parameters of a dataset and other instructions for clustering the dataset through the iteration of a regression algorithm and a KM, KHM or EM performance function applied to the set number functions as described above. In this manner, program instructions 13 may used to generate a plurality of different functions correlating variable parameters of a dataset. In addition, program instructions 13 may include instructions for determining directives by which to classify new data into the dataset with respect to the generated functions. In some cases, program instructions 13 may further include instructions by which to receive new data and predict values of variable parameters associated with the new data and dataset. A more detailed description of program instructions 13 are provided below in reference to the processes outlined in FIG. 2.

As noted above, an EM, KM or KHM objective function may be used for the regression clustering process of dataset 14 and, therefore, three methods of regression clustering (RC) are provided herein. In each case, a set number of functions, K, may be selected from a family of functions, $\Phi$, derived from the variable parameters within dataset 14. The functions may be selected randomly or by any heuristics that are believed to give a good start. The determination of the optimum K may include techniques used in the data mining industry for clustering. For example, in embodiments in which Mean-Square Error (MSE) linear regression is used in the RC process, selecting the number of K functions may include initializing coefficients, $c_k$, of the functions $\{c_k|k=1, \ldots K\}$. In embodiments in which dataset 14 represents a plurality of datasets, each of the datasets is separately processed with respect to the selected K functions. Information representing the processed data is collected at a central station and $c_k$ is recalculated to compensate for the differences between each of the datasets.

In addition to selecting a set number of functions, each of the regression clustering methods described herein may include applying K regression functions, M (where $M=\{f_1, \ldots, f_K\} \subset \Phi$), to dataset 14, finding its own partition, $Z_k$, and regressing on the partition. The K regression functions are not necessarily linear. Both parts of the process, i.e., the K regressions and the partitioning of dataset 14, optimize a common objective function. As will be described in more detail below, the partition of the dataset can be "hard" or "soft." A "hard" partition may refer to the designation of every of datapoint within dataset 14 belonging to a specific subset of datapoints. In this manner, the partitions of the datapoints may be clear and distinct. A "soft" partition, however, may refer to the ambiguous groupings of datapoints within subsets of dataset 14. In some cases, such a categorization of datapoints may depend on the probability of datapoints belonging to particular subsets within dataset 14 rather than other subsets. Such a soft-partitioning of data is employed by the KHM and EM regression clustering methods as described in more detail below.

The method of regression clustering using a K-Mean objective function (referred to herein as RC-KM) solves the following optimization problem, $$\min_{\{f_k\} \subset \Phi; \{Z_k\}} \operatorname{Perf}_{RC-KM} = \sum_{k=1}^{K} \sum_{(x_i, y_i) \in Z_k} e(f_k(x_i), y_i) \quad (1)$$

where Z represents a dataset with supervising responses x and y (i.e., $Z=(X,Y)=\{(x_i,y_i)| i=1, \ldots, N\}$) and $Z=\cup_{k=1}^{K} Z_k$ ($Z_k \cap Z_{k'} = \emptyset$, $k \neq k'$). The optimal partition will satisfy $$Z_k = \{(x,y) \in Z | e(f_k^{opt}(x), y) \leq e(f_{k'}^{opt}(x), y) \, \forall k' \neq k\}, \quad (2)$$

which allows the replacement of the function in optimization problem (2) to result in $$\operatorname{Perf}_{RC-KM}(Z, \{f_k\}_{k=1}^{K}) = \sum_{i=1}^{N} \operatorname{MIN}\{e(f_k(x_i), y_i) | k = 1, \ldots, K\}. \quad (3)$$

In other words, RC-KM determines an optimal clustering of datapoints by regressing functional relationships of the datapoints to have a minimum amount of total variation or error (e).

In general, the process of RC-KM may be executed through a monotone-convergent algorithm to find a local optimum of equation (1). One example of an RC-KM algorithm may include a first set of instructions for picking a set number of functions, K, within a dataset as described above. In embodiments in which linear regression is used in the RC process, selecting the number of K functions may include initializing coefficients, $c_k$, of the functions $\{c_k|k=1, \ldots K\}$. In other embodiments, the selected functions may not be linear. In any case, the RC-KM algorithm may include a second set of instructions for repartitioning the dataset in the r-th iteration, $r=1, 2, \ldots$, as $$Z_k^{(r)} = \{(x,y) \in Z | e(f_k^{(r-1)}(x), y) \leq e(f_{k'}^{(r-1)}(x), y) \, \forall k' \neq k\}. \quad (4)$$

Such a repartitioning process facilitates a "hard" partition, as defined above.

Each datapoint within the dataset may be associated with the regression function that results in the smallest approximation error on it. Using the RC-KM algorithm, distances between each of the datapoints and the regression functions may be determined and the errors of fitting the datapoints to the functions are compared. Algorithmically, for $r>1$, a data point in $Z_k^{(r-1)}$ is moved to $Z_{k'}^{(r)}$ if and only if a) $e(f_{k'}^{(r-1)}(x), y) < e(f_k^{(r-1)}(x), y)$ and b) $e(f_{k'}^{(r-1)}(x), y) \leq e(f_{k''}^{(r-1)}(x), y)$ for all $k'' \neq k, k'$.

$Z_k^{(r)}$ inherits all the data points in $Z_k^{(r-1)}$ that are not moved. In the event of a tie between the error functions, the datapoint may be randomly grouped in either subset.

In addition to the program instructions for function selection and clustering, the RC-KM algorithm may include a third set of program instructions for running a regression optimization algorithm. In particular, the third set of instructions may include an algorithm by which to alter the selected functions to more closely represent the datapoints within the respective partitions. In some cases, variable selections for the K regressions can be done on each partition independently with the understanding that an increase in the value of the objective function could be caused by such a process. In any case, the third set of program instructions may include any regression optimization algorithm that results in the following:

$$f_k^{(r)} = \arg\min_{f \in \Phi} \sum_{(x_i, y_i) \in Z_k} e(f(x_i), y_i) \quad (5)$$

where $k=1, \ldots, K$. In some embodiments, regularization techniques may be employed to prevent over-fitting of the converged results from the regression algorithm. In addition or alternatively, boosting techniques may be used on each partition independently to improve the quality of the converged results within each partition. In any case, the regression algorithm may be selected by the nature of the original problem or other criteria. The fact that it is included in a regression clustering process adds no additional constraint on its selection.

In order to cluster the data into the optimum partitions, the second and third set of instructions of the RC-KM algorithm may be conducted repeatedly. Optimally, such a reiterative process continues until there is no more datapoints changing their membership within the partitions. If any datapoint does change its partition membership as a result of the second and third sets of instructions, the value of the objective function in equation (1) decreases. Consequently, the value of the objective function in equation (1) continues to decrease with each membership change. As a result, the RC-KM algorithm stops in finite number of iterations.

As noted above, some clustering techniques, such as K-Means clustering methods, may be sensitive to the initialization of partition centers. Similarly, RC-KM may be sensitive to the initialization of its K functions. More specifically, the convergence of data into clusters using RC-KM may depend on how closely the initial set of K functions represent the data, since the datapoints are partitioned into distinct subsets (i.e., hard partitioned) with respect to the selected functions during each iteration of the algorithm. In general, the initialization of the K functions may be dependent on the amount of and quality of available prior information. In many instances, however, there is minimal or no prior information available regarding the functional relationship of variables within a dataset. In some cases, more than one functional relationship may be found to represent a partition of data. As a result, convergence to a distinct set of partitions may be difficult using RC-KM techniques. In other cases, however, the initialization of the K functions using RC-KM may be good and, as a result, a dataset may be clustered into an optimum set of partitions using an RC-KM algorithm.

In contrast to K-Means clustering techniques, K-Harmonic Means (KHM) clustering algorithms are generally less sensitive to the initialization of the K functions due to KHM's methods of dynamically weighting data points and its "soft" partitioning scheme. An exemplary harmonic average based clustering method is described in U.S. Pat. No. 6,584,433 to Zhang et al. and is incorporated by reference as if fully set forth herein. Similar to KHM clustering, the K-Harmonic Means regression clustering process (RC-KHM$_p$) described herein is generally less sensitive to the initialization of the K functions as discussed in more detail below. RC-KHM$_p$'s objective function is defined by replacing the MIN( ) function in equation (3) by the harmonic average function, HA( ). In addition, the error function may be represented as $e(f_k(x_i), y_i) = \|f_k(x_i) - y_i\|^p$, where $p \geq 2$. As a result, the objective function of RC-KHM$_p$ may be:

$$Perf_{RC-KHM_p}(Z, M) = \sum_{i=1}^{N} HA_{1 \leq k \leq K}\{\|f_k(x_i) - y_i\|^p\} \quad (6)$$

$$= \sum_{i=1}^{N} \frac{K}{\sum_{k=1}^{K} \frac{1}{\|f_k(x_i) - y_i\|^p}}$$

In general, different values of parameter p may represent different distance functions.

As noted above, an exemplary method of K-Harmonic Means regression clustering is depicted in the flowchart of FIG. 3. Such a method is described herein in reference to an exemplary algorithm for RC-KHM$_p$. As with RC-KM, RC-KHM$_p$ may be employed through an algorithm which includes a first set of instructions for selecting a set number of K functions randomly or by any heuristics that are believed to give a good start. Such a process is noted as block 30 in FIG. 3. In embodiments in which linear regression is used for the RC process, the step may include initializing coefficients, $c_k$, of the functions $\{c_k | k=1, \ldots K\}$. In other embodiments, the selected functions may not be linear.

As noted above, the selected functions may be a subset of a plurality of functions used to correlate variable parameters of a dataset. In contrast to the hard partitioning used in RC-HM, RC-KHM$_p$ uses a soft partitioning scheme. Consequently, datapoints may not be distinctly associated with a single function when using an RC-KHM$_p$ algorithm. Rather, the RC-KHM$_p$ process may include determining the distances between each of the datapoints and each of the functions and computing probability and weighting factors associated with such distances for each of the datapoints as noted in blocks 32 and 36 in the flowchart of FIG. 3, respectively. In turn, the RC-KHM$_p$ algorithm may include a second set of instructions to determine approximate associations of the datapoints to the K functions based upon the probability and weighting factors. The calculation of the harmonic averages noted in block 34 may be used in the objective function of RC-KHM$_p$ as noted in equation (6) above and explained in more detail below. In general, the calculations of the weighting and probability factors may be computed by the second set of program instructions. In this manner, the value of the weighting and probability factors may be dependent of the value of the local datapoints $z_i \in Z_i$ as well as the values of the "global" or "common" coefficient vectors $\{c_k | k=1, \ldots K\}$ in some cases.

In general, the probability of the i-th data point belonging to a particular k function may be computed as:

$$p(Z_k | z_i) = \frac{d_{i,k}^{p+q}}{\sum_{l=1}^{K} d_{i,l}^{p+q}}. \quad (7)$$

wherein $$d_{i,k} = \|f_k^{(r-1)}(x_i) - y_i\|. \quad (8)$$

The parameter q may be used to put the regression's error function as noted in equation (10) below in L$^q$-space. In addition, the parameter q may be used to reduce the association of datapoints to more than one of the selected K functions. In any case, the weighting factor for each datapoint may be computed using (i.e., each data point's participation may be weighted by):

$$a_p(z_i) = \frac{\sum_{l=1}^{K} d_{i,l}^{p+q}}{\sum_{l=1}^{K} d_{i,l}^{p}}. \quad (9)$$

In this manner, not all datapoints fully participate in all iterations in RC-KHM$_p$ like in RC-KM. As shown in equation (9), the value of weighting function $a_p(z_i)$ for a particular datapoint is closely related to the distance between the datapoint and the function. In particular, the value of weight function $a_p(z_i)$ is smaller when the datapoint is closer to the function than if the datapoint is farther away from the function. Weighting function $a_p(z_i)$ changes in each iteration as the regression functions are updated and, thus, is dynamic. As described above in reference to RC-KM and will be described below in reference to RC-EM, the participation of each datapoint is not weighted. As such, $a_p(z_i)$ is equal to 1 in RC-KM and RC-EM as noted below in equations (18) and (22).

As shown in block 38 in the flowchart of FIG. 3, the RC-KHM$_p$ process may include regressing K functions using the probability and weight factors computed in block 36. In particular, the RC-KHM$_p$ process may run any regression optimization algorithm that results in:

$$f_k^{(r)} = \arg\min_{f \in \Phi} \sum_{i=1}^{N} a_p(z_i) p(Z_k | z_i) \|f(x_i) - y_i\|^q \quad (10)$$

where k=1, . . . , K. For simpler notations, $p(Z_k|z_i)$ and $a_p(z_i)$ are not indexed in equation (10) by q or p. In addition, $d_{i,k}$, $p(Z_k|z_i)$, and $a_p(z_i)$ in equations (7), (8), (9) and (10) are not indexed by the iteration r to simplify notations. As in RC-KM, variable selections for the K regressions in RC-KHM$_p$ can be done on each partition independently with the understanding that an increase in the value of the objective function could be caused by such a process. In addition, regularization techniques and/or boosting techniques may be employed to improve the quality of the converged results. In any case, the regression algorithm may be selected by the nature of the original problem or other criteria. The fact that it is included in a regression clustering process adds no additional constraint on its selection.

Block 40 includes the reiteration of blocks 34, 36, and 38 for the regressed set of functions. More specifically, the RC-KHM$_p$ process involves determining the distances between each of the data points and the regressed functions, calculating harmonic averages of such distances and computing probability and weighting factors for the datapoints based upon the determined distances. Blocks 42, 44, and 46 outline a method for relating the information within the dataset, such as the datapoints and the probability and weighting factors, with dataset information from other data sources. In other words, blocks 42, 44 and 46 outline a scheme for regressively clustering data distributed across several distinct data sources. A more detailed description of such a process is provided below subsequent to the description of the EM regression clustering technique. As noted above, dataset 14 may, in some embodiments, represent a plurality of datasets from distributed sources. Consequently, blocks 42, 44, and 46 may be employed in such an embodiment. In other cases, such as when dataset 14 does not represent a plurality of different datasets, blocks 42, 44 and 46 may be omitted from the RC process.

Referring to block 48, the RC-KHM$_p$ process may include computing a change in harmonic averages for the K functions prior to and subsequent to the regressing process described in reference to block 38. Such a computation may be included within the objective function for RC-KHM$_p$ as cited in equation (6) above. Block 50 may be used to determine if the change in harmonic averages is greater than a predetermined value. More specifically, since there is no discrete membership change in RC-KHM$_p$, the continuation or termination of the method may be determined by measuring the changes to the RC-KHM$_p$ objective function (i.e., equation (6)). For example, in embodiments in which the change in harmonic average (i.e., the objective function) is greater than the predetermined value, the method may revert back to block 32 and determine distances between datapoints of the dataset and values correlated with the new set of functions computed from blocks 40–46. The method may subsequently follow the flow blocks 34–50 and, thus, provides an iterative process until the change in harmonic averages is reduced to a value below the predetermined level noted in block 50.

As shown in FIG. 3, upon determining the change in harmonic averages (i.e., the objective function) is less than the predetermined value, the method may continue to block 52. In particular, when the change in the objective function is less than a predetermined value, the method may continue to block 52. Alternatively, the method may continue to block 52 when value of the objective function is less than a predetermined value. As noted in FIG. 3, block 52 may include determining directives by which to classify new data into the dataset with respect to the set number of functions. A more detailed description of such a process is described in more detail below in reference to block 21 of FIG. 2.

Referring to an RC-EM process, the objective function is defined as $$\mathrm{Perf}_{RC-EM}(Z, M) = -\log\left\{\prod_{i=1}^{N}\sum_{k=1}^{K} \frac{p_k}{\sqrt{(2\pi)^d |\Sigma_k|}} \mathrm{EXP} \right. \quad (11)$$
$$\left. \left(-\frac{1}{2}(f_k(x_i) - y_i)\Sigma_k^{-1}(f_k(x_i) - y_i)^T\right)\right\}$$

where d=dimension (Y). In the case in which d=1, $(f_k(x_i) - y_i)$ is a real number and $\Sigma_k^{-1} = 1/\sigma_k^2$. An exemplary RC-EM algorithm may include a first set of instructions to select a set number of K functions, as described in reference to RC-KM and RC-KHM$_p$. In embodiments in which linear regression is used during the RC process, the first set of instructions may include instructions for initializing coefficients, $c_k$, of the functions $\{c_k|k=1, \ldots K\}$. In other embodiments, the selected functions may not be linear. In addition to function selection, the RC-EM algorithm may include two steps by which to regressively cluster a dataset. In particular, the RC-EM algorithm may include an expectation step (E-Step) and a maximization step (M-Step).

In general, the E-Step may be used to determine how much of each datapoint is related to each subset. Such a step may be conducted by computing a probability factor in which:

$$p(Z_k^{(r)} | z_i) = \quad (12)$$
$$\frac{\frac{p_k^{(r-1)}}{\sqrt{|\Sigma_k|}}\mathrm{EXP}\left(-\frac{1}{2}(f_k^{(r-1)}(x_i) - y_i)\Sigma_{r-1,k}^{-1}(f_k^{(r-1)}(x_i) - y_i)^T\right)}{\sum_{k=1}^{K}\frac{p_k^{(r-1)}}{\sqrt{|\Sigma_k|}}\mathrm{EXP}\left(-\frac{1}{2}(f_k^{(r-1)}(x_i) - y_i)\Sigma_{r-1,k}^{-1}(f_k^{(r-1)}(x_i) - y_i)^T\right)}.$$

The M-Step may use such a probability factor to regress the selected functions of the dataset. In particular, the M-step may use the following equations to regress the functions of a dataset $$p_k^{(r)} = \frac{1}{N}\sum_{i=1}^{N} p(Z_k^{(r)} | z_i) \quad (13)$$

$$f_k^{(r)} = \arg\min_{f \in \Phi} \sum_{i=1}^{N} p(Z_k^{(r)}, z_i)\|f(x_i) - y_i\|^2 \quad (14)$$

-continued $$\Sigma_{r,k} = \frac{\sum_{i=1}^{N} p(Z_k^{(r)} | z_i)(f_k^{(r)}(x_i) - y_i)^T (f_k^{(r)}(x_i) - y_i)}{N * p_k^{(r)}} \quad (15)$$

The E-Step and M-Step may be conducted in an iterative process. As with RC-KM, RC-EM may be sensitive to the initialization of functions and, consequently, may have difficultly in converging the datapoints in an optimal set of subsets in some embodiments. In other cases, however, the initialization of functions within a dataset may be good and the dataset may be clustered into an optimum set of partitions using an RC-EM algorithm.

As noted above, blocks 42, 44 and 46 in FIG. 3 may be used to relate information, such as the datapoints and the probability and weighting factors, between a plurality of datasets. In other words, blocks 42, 44 and 46 may be used to regressively cluster data distributed across several distinct data sources. Such a process may be used in any of the regression methods described above, namely RC-KM, RC-KHM and RC-EM. As such, although blocks 42, 44 and 46 are shown in FIG. 3 as included within the RC-KHM process, the processes are not restricted to such a technique. As shown in block 42, matrices may be developed from the datapoints and the probability and weighting factors associated with the datasets stored therein.

The matrices developed may be set forth as $A_{l,k}$ and $b_{l,k}$, $$(A_{k,l} = \overline{X}_l^T * \text{diag}(w_{k,l}) * \overline{X}, b_{k,l} = \overline{X}_l^T * \text{diag}(w_{k,l}) * Y), k=1, \ldots, K \quad (16)$$

where the data set $(\overline{X}, Y)$ located on L data sources, $(\overline{X}_l, Y_l), l=1, \ldots, L$, is the subset on the $l^{th}$ computer and the size of the $(\overline{X}_l, Y_l)$ is $N_l$. The diagonal matrix of $(w_{l,k}) = \text{diag}\{a_p(z_i) \ p(Z_k|z_i) | i \in \text{subset of indices of the datapoints in the } l^{th} \text{ computer}\}$ with $a_p(z_i)$ and $p(Z_k|z_i)$ defined with the respect to the type of regression clustering technique used to cluster the dataset. In particular, $a_p(z_i)$ and $p(Z_k|z_i)$ may be defined as noted below with respect to using a RC-KM, RC-KHM or an RC-EM technique to cluster the data.

RC-KM:

$$p(Z_k | z_i) = \begin{cases} 0 & k \neq \arg\min\{\|f_{k'}(x_i) - y_i\|^2\} \\ 1 & k = \arg\min\{\|f_{k'}(x_i) - y_i\|^2\} \end{cases} \quad (17)$$

$$a(z_i) = 1 \quad (18)$$

RC-KHM:

$$p(Z_k | z_i) = d_{i,k}^{p+q} \Big/ \sum_{l=1}^{K} d_{i,l}^{p+q}. \quad (19)$$

$$a_p(z_i) = \sum_{l=1}^{K} d_{i,l}^{p+q} \Big/ \sum_{l=1}^{K} d_{i,l}^{p}. \quad (20)$$

RC-EM:

$$p(Z_k^{(r)} | z_i) = \frac{\frac{p_k^{(r-1)}}{\sqrt{|\Sigma_k|}} \text{EXP}\left(-\frac{1}{2}(f_k^{(r-1)}(x_i) - y_i) \sum_{r-1,k}^{-1} (f_k^{(r-1)}(x_i) - y_i)^T\right)}{\sum_{k=1}^{K} \frac{p_k^{(r-1)}}{\sqrt{|\Sigma_k|}} \text{EXP}\left(-\frac{1}{2}(f_k^{(r-1)}(x_i) - y_i) \sum_{r-1,k}^{-1} (f_k^{(r-1)}(x_i) - y_i)^T\right)} \quad (21)$$

$$a(z_i) = 1 \quad (22)$$

The method may continue to block 44 in which matrices from multiple data sources are combined. From such a composite of matrices, a common coefficient vector may be calculated for each regressed function and multiplied thereto as noted in block 46. In general, the common coefficient vectors may be used to compensate for variations between similar sets of functions between the multiple datasets. More specifically, the common coefficient vector may be used to compensate for variations between sets of functions having similar variable parameters. The optimal common coefficient vector, $c_k$, may be calculated by summing the matrices such that $$A_k = \overline{X}^T * \text{diag}(w_k) * \overline{X} = \sum_{l=1}^{L} \overline{X}_l^T * \text{diag}(w_{k,l}) * \overline{X} \quad (23)$$

$$b_k = \overline{X}^T * \text{diag}(w_k) * Y = \sum_{l=1}^{L} \overline{X}_l^T * \text{diag}(w_{k,l}) * Y, k = 1, \ldots, K$$

and using such summed matrices to compute $c_k$ as:

$$c_k = A_k^{-1} b_k, k=1, \ldots, K. \quad (24)$$

Although such a computation does involve the transfer of information between the datasets and a central station, the amount of data transferred is significantly smaller than the size of each dataset. Choosing $\overline{D}$ functions as a basis, $A_{k,l}$ is a $\overline{D} \times \overline{D}$ matrix and $b_{k,l}$ is a $\overline{D}$ dimensional vector. The total number of floating point numbers to be transmitted from each dataset to the central station is $\overline{D}^2 + \overline{D}$. The total size of all the coefficients $c_k$, which are transmitted back from the central station to all of the datasets, is $\overline{D} \times K$ floating point numbers. All these sizes are minute compared with the size of the datasets.

As noted above, the system and methods described herein may be configured to regressively cluster and classify a dataset. An exemplary flowchart of a method including such regression clustering and classification processes is outlined in FIG. 2. In particular, block 20 in FIG. 2 includes generating a plurality of different functions correlating variable parameters of a dataset. Such a process may be conducted by any of the regression clustering methods described above, namely RC-KM, RC-KHM or RC-EM. In addition, the method depicted in FIG. 2 includes block 21 in which directives by which to classify new data into the dataset with respect to the generated functions are determined. Such a step is outlined also outlined in block 52 in FIG. 3. In general, blocks 21 and 52 may be performed through the application of any classification algorithm, such as decision trees, the super value method, or any other techniques used in the data mining industry for classifying. In other words, a classifier, k=C(x), can be trained using the labels provided by the clustering phase of the RC algorithm. The variable parameters included within the classification directives may or may not be related to the variable parameters analyzed by the regression clustering process.

In addition to regressively clustering and classifying a dataset, the method depicted in FIG. 2 may include steps by which to receive new data and predict values associated with variable parameters associated with the new data and dataset. More specifically, the method depicted in FIG. 2 may include the processes detailed in block 22 which includes receiving new data associated with the dataset. In general, the new data may include one or more datapoints corresponding to a first variable parameter of the dataset. In other words, the new data may include one or more known values of a first variable parameter. In some embodiments, the new data may include input values for other variable parameters as well. In some cases, the input value/s corresponding to the first variable parameter may not be values which were previously included within the dataset regressively clustered by block 20. In other embodiments, however, the input value/s of the first variable parameter may be similar to values within the original dataset. In any case, the new data may be absent of a datapoint for a second variable parameter associated with the dataset. In particular, the new data may not include one or more values of a second variable parameter which is associated with the first variable parameter.

Predicting the value of the second variable parameter relative to the value/s of the first variable parameter may, in some embodiments, be advantageous. For example, predicting the value of the second variable parameter may be useful in forecasting production sales or weather as noted above. The prediction of the second variable parameter may be used in a variety of other applications as well and, therefore, is not limited to the forecast of production sales and/or weather. Consequently, the method and system described herein may be configured to determine, as noted in block 23 of FIG. 2, the probability that the second variable parameter is correlated to the first variable parameter for each function generated in block 20. More specifically, the method and system may be configured to determine the probability that the second variable parameter is correlated to the first variable parameter based on the classification directives determined in block 21. An exemplary approach to the determination of such probabilities is outlined below.

Assuming that dataset X is randomly sampled from hidden density distribution function P( ), a Kernel density estimation on the K X-projections of $Z_k = \{p(Z_k|z)|z=(x,y) \in Z\}$ gives:

$$\hat{P}(x|X_k) = \frac{\frac{1}{N}\sum_{i=1}^{N} p(Z_k|z_i)H\left(\frac{x_i-x}{h}\right)}{\hat{P}(X_k)} \quad \text{with} \quad (25)$$

$$\hat{P}(X_k) = \frac{1}{N}\sum_{i=1}^{N} p(Z_k|z_i). \quad (26)$$

Equations (19) and (21) are respectively referenced for $p(Z_k|z_i)$ when RC-KHM and RC-EM are used to regressively cluster the dataset. The actual clustered subsets generated from RC-KM serve as $p(Z_k|z_i)$ in embodiments which RC-KM is used to regressively clusters the dataset. H( ) in equation (25) is a symmetric kernel estimate function and h is a bandwidth variable. Summing the density estimation of each subset results in the kernel density estimation on the whole dataset:

$$\hat{P}(x) = \sum_{k=1}^{K} \hat{P}(x|X_k)\hat{P}(X_k) = \frac{1}{N}\sum_{i=1}^{N} H\left(\frac{x_i-x}{h}\right). \quad (27)$$

Bayes' inversion gives the probability of x belonging to each subset:

$$\hat{P}(X_k|x) = \frac{\hat{P}(x|X_k)\hat{P}(X_k)}{\hat{P}(x)} = \frac{\sum_{i=1}^{N} p(Z_k|z_i)H\left(\frac{x_i-x}{h}\right)}{\sum_{i=1}^{N} H\left(\frac{x_i-x}{h}\right)} \quad (28)$$

As shown in FIG. 2, the method may include block 24 in which a selection of the technique used to predict values for the second variable parameter is determined. In particular, the technique selected at block 24 determines whether a single value or multiple values are predicted for the second variable parameter. As shown in FIG. 2, the single-value prediction process may continue to block 25 in which a selection of the technique used to predict a single value for the second variable parameter is determined. As shown in FIG. 2, the method may, in some embodiments, continue to block 26 in which the function with the highest probability of representing a correlative relationship between the first and second parameters is selected. In particular, block 26 may include selecting the function with the highest probability through the equation of:

$$C(x) = \underset{1 \leq k \leq K}{\operatorname{argmax}} \{\hat{P}(X_k|x)\} \quad (29)$$

The single-value prediction process may continue to block 27 in which the value for the second variable parameter is calculated from the function selected from equation (29). More specifically, block 27 may include plugging the value of the first variable parameter into the selected function to determine the value of the second variable parameter. In some embodiments, the process of predicting a single value for the second variable parameter may continue to block 28 as shown in FIG. 2. Block 28 may include predicting a value of the second variable parameter having the highest probability of correlating to a plurality of the generated functions. In some embodiments, block 28 may include predicting a value of the second variable parameter having the highest probability of correlating to all of the generated functions. In particular, the expected value of the second variable parameter may be calculated by:

$$E(\tilde{f}(x)|x) \approx \sum_{k=1}^{K} f_k(x)\hat{P}(X_k|x) \quad (30)$$

-continued $$= \frac{\sum_{i=1}^{N}\left[\sum_{k=1}^{K} f_k(x)p(Z_k \mid z_i)\right]H\left(\frac{x_i - x}{h}\right)}{\sum_{i=1}^{N} H\left(\frac{x_i - x}{h}\right)}$$

wherein $\tilde{f}(x)$ is random variable prediction which equals $f_k(x)$ with probability $P(X_k|x)$. In other embodiments, however, block 28 may include predicting a value of the second variable parameter having the highest probability of correlating to less than all of the generated functions. In either case, the predicted value of the second variable parameter may be weighted in reference to the probability of a plurality the generated functions to have such a value for the second variable parameter. Regardless of whether the prediction of the second variable parameter follows the highest probability function route to blocks 26 and 27 or the highest probability route to block 28, the single-value prediction technique may be advantageous in some embodiments. For example, the forecast of a single sales goal from a dataset of production sales information may be desirable for a sales organization. Other applications may recognize advantages from the single-value prediction as well.

In other embodiments, the prediction of a plurality of possible values for the second variable parameter may be desirable. In particular, the prediction of a plurality of possible values may allow values with significantly smaller standard deviations to be forecasted for the second variable parameter relative to embodiments in which a single value is estimated. For example, a multiple-value prediction of the amount of atmospheric humidity for a particular day may include values of 35%, 37% and 41%, each with a standard variation approximately 1%. A method which predicts only one value, on the other hand, may produce a humidity estimation of approximately 38% with a standard deviation of approximately 5%. In addition to value estimations with smaller standard deviations, the multiple-value technique may include conditional directives with the prediction of the plurality of values. More specifically, the possible values may be correlated to a particular condition. For example, in meteorology applications, a plurality of temperatures may be forecasted relative to the atmospheric conditions for an upcoming day. For instance, a high temperature of 60° F. may be predicted for a condition in which it rains all day, a temperature of 68° F. may be forecasted for a condition in which it rains only in the morning and a temperature of 70° F. may be predicted for a condition in which it is sunny all day. Consequently, a technique used to predict a plurality of possible values for the second variable parameter is also provided and described in more detail below.

As shown in FIG. 2, the method may, in some embodiments, continue to block 29 from block 24. In particular, block 29 specifies that a plurality of possible values for the second variable parameter are predicted. In general, the plurality of possible values may be based upon the known value of the first variable parameter, the plurality of functions generated in block 20 and the classification directives determined in block 21. In some embodiments, the plurality of values may be determined by equation (30). In yet other embodiments, however, the plurality of values may be derived directly from the functions generated in block 20. In particular, the determination of the plurality of possible values for the second variable parameter may include plugging the value/s of the first variable parameter into each of the generated functions. In either case, block 29 may generate K possible values each with a relatively small uncertainty, which is defined by the probability distribution $\{P(X_k|x), k=1, \ldots, K\}$. Using the concept that the total variance of the variable parameters with the dataset equals the within-cluster variance plus the between-cluster variance, the multiple-value prediction technique splits the total variance into the within-cluster variance and the between-cluster variance. The between cluster-variance can be reduced or eliminated if any knowledge outside the dataset helps to choose the k function when a new input x is given.

The above discussion is meant to be illustrative of the principles and various embodiments of the present invention. Numerous variations and modifications will become apparent to those skilled in the art once the above disclosure is fully appreciated. For example, the systems and methods described herein may be incorporated within any type of data system, including those with distributed data and non-distributed data. It is intended that the following claims be interpreted to embrace all such variations and modifications.

What is claimed is:

1. A processor-based method, comprising:
   generating a plurality of different functions that correlate datapoints of a dataset through a regression clustering algorithm; and
   determining directives by which to categorize new data into the dataset through a classification algorithm.

2. The processor-based method of claim 1, further comprising receiving a set of new data, wherein the set of new data comprises a known value for a first variable parameter of the dataset and is absent of a value for a second variable parameter of the dataset.

3. The processor-based method of claim 2, further comprising:
   selecting a function having the highest probability of representing the correlative relationship between the first and second variable parameters; and
   predicting the value of the second variable parameter from the selected function.

4. The processor-based method of claim 2, further comprising predicting a value with the highest probability of correlating to a plurality of the generated functions for the second variable parameter.

5. The processor-based method of claim 2, further comprising predicting a plurality of possible values for the second variable parameter based upon the value of the first variable parameter.

6. The processor-based method of claim 1, wherein said generating the plurality of different functions comprises applying a regression algorithm and a K-Harmonic Means performance function on the datasets.

7. The processor-based method of claim 1, wherein said generating the plurality of different functions comprises applying a regression algorithm and a K-Means performance function on the datasets.

8. The processor-based method of claim 1, wherein said generating the plurality of different functions comprises applying a regression algorithm and an Expectation Maximization performance function on the datasets.

9. A storage medium comprising program instructions executable by a processor for:
   generating a plurality of different functions that correlate variable parameters of a dataset;
   based upon the different functions, determining classification directives by which to group new data into the dataset; and based upon the classification directives, selecting one of the functions to predict a value of a variable parameter associated with one or more known input values of the new data.

10. The storage medium of claim 9, wherein the program instructions for selecting comprise program instructions for selecting the function with the highest probability of representing a correlative relationship between the one or more known input values and the variable parameter.

11. The storage medium of claim 9, wherein the program instructions for selecting the function with the highest probability comprise program instructions for:
  determining a kernel density estimation for each of the plurality of functions;
  summing the kernel density estimations; and
  determining, from the kernel density estimation summation, the probability of each function representing a correlative relationship between the value of the variable parameter and the one or more known input values.

12. The storage medium of claim 9, wherein the variable parameter associated with the predicted value is one of the variable parameters correlated by the plurality of different functions.

13. The storage medium of claim 9, wherein the variable parameter associated with the predicted value is unrelated to the variable parameters correlated by the plurality of different functions.

14. The storage medium of claim 9, wherein the program instructions for generating comprise program instructions for regressively clustering the dataset.

15. The storage medium of claim 9, wherein the program instructions for generating comprise program instructions for generating a plurality of functions for a partially labeled dataset.

16. The storage medium of claim 9, wherein the program instructions for generating comprise program instructions for generating a plurality of functions from a partially completed dataset.

17. A storage medium comprising program instructions executable by a processor for:
  generating a plurality of different functions that correlate variable parameters of a dataset;
  receiving new data associated with the dataset, wherein the new data comprises known input values for a first set of the variable parameters and is substantially absent of values for a second set of the variable parameters; and
  determining a plurality of possible values for at least one value of the second set of the variable parameters based upon the known input values of the first set of variable parameters and the plurality of different functions.

18. The storage medium of claim 17, wherein the program instructions for determining comprise program instructions for determining the same number of possible values as the number of generated functions.

19. The storage medium of claim 17, further comprising program instructions executable by the processor for determining classification directives by which to group new data into the dataset based upon the different functions.

20. The storage medium of claim 17, wherein the program instructions for generating comprise program instructions for:
  selecting a set number of functions correlating variable parameters of a dataset;
  determining distances between datapoints of the dataset and values correlated with the set number of functions;
  calculating harmonic averages of the distances;
  regressing the set number of functions using datapoint probability and weighting factors associated with the determined distances;
  repeating said determining and calculating for the regressed set of functions;
  computing a change in harmonic averages for the set number of functions prior to and subsequent to said regressing; and
  reiterating said regressing, repeating and computing upon determining the change in harmonic averages is greater than a predetermined value.

21. A system, comprising:
  a dataset;
  a means for generating a plurality of different functions that correlate datapoints of the dataset;
  a means for classifying new data into the dataset with respect to the plurality of different functions; and
  a means for predicting one or more values for a variable parameter associated with input values of the new data.

22. The system of claim 21, wherein the means for predicting the one or more values comprises a means for determining a value of the variable parameter for each of the plurality of functions.

23. The system of claim 21, wherein the means for predicting the one or more values comprises:
  a means for determining the function with the highest probability of representing the correlative relationship between the variable parameter and input values; and
  a means for determining the value of the variable parameter from the function.

24. The system of claim 21, wherein the means for predicting the one or more values comprises a means for determining a value with the highest probability of correlating to a plurality of the different functions for the variable parameter.

25. A system, comprising:
  an input port configured to access a dataset; and
  a processor configured to:
    regressively cluster the dataset to generate functions that correlate datapoints of the dataset; and
    determine classifiers by which to correlate new data with respect to the generated functions.

26. The system of claim 25, wherein the processor is further configured to predict values of one or more variable parameters associated with the new data.

27. The system of claim 26, wherein the processor is configured to:
  select a function which best represents the new data; and
  predict the values of the one or more variable parameters from the selected function.

28. The system of claim 26, wherein the processor is configured to predict a value with the highest probability of correlating to a plurality of the different functions for the variable parameter.

29. The system of claim 26, wherein the processor is configured to predict a plurality of possible values for the one or more variable parameters.

* * * * *